3,378,543
PURIFYING ESTERS OF POLYHYDRIC
ALCOHOLS
Charles J. O'Boyle, Gramercy, La., assignor to North
American Sugar Industries Incorporated, New York,
N.Y., a corporation of New Jersey
No Drawing. Continuation-in-part of application Ser. No.
263,349, Mar. 6, 1963. This application July 13, 1964,
Ser. No. 382,392
14 Claims. (Cl. 260—210)

ABSTRACT OF THE DISCLOSURE

A method for removing extraneous solvents from preparations of polyhydric alcohols is disclosed wherein the crude ester-containing mass is dispersed in a wash solvent with which the extraneous solvent to be removed is soluble, but in which the ester to be purified is of reduced solubility. Where the wash solvent is water, the acid moiety of the polyhydric alcohol ester should have from 14 to 24 carbon atoms and a titre of at least about 50° C. Methods for the preparation and partial purification of polyhydric alcohol esters are also described.

This application is a continuation-in-part of parent application Ser. No. 263,349, filed Mar. 6, 1963, now U.S. Patent No. 3,141,013.

This invention relates to a process for refining esters of polyhydric alcohols and in particular it is concerned with a method for removing certain solvents which may be mixed with the esters of polyhydric alcohols as impurities.

The invention provides improvements and procedures for the preparation of the esters of solid polyhydric alcohols by which an ester product containing acceptably small amounts of processing solvents may be obtained.

The esters of solid polyhydric alcohols which are to be purified within the scope of this invention are useful as chemical intermediates and surface-active agents. As chemical intermediates, they are useful in the preparation of synthetic resins, waxes, drying oils, and lubricants. As surface-active agents, they are useful as emulsifiers, solubilizers, dispersing and wetting agents, textile processing assistants, and ingredients in detergents, cosmetics, pharmaceuticals and foods.

Ester compositions of the type sought to be made and purified have found only limited commercial use, in spite of their value in the applications mentioned above, because of difficulties which have been experienced in isolating and refining them after they have been synthesized.

The ester products described above are generally made by a transesterification reaction between a polyhydric alcohol and an ester (for example, a methyl ester or triglyceride fat) as represented by the equation:

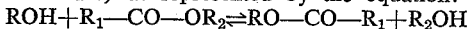

where R represents the residue of the polyhydric alcohol, $R_1$—CO represents the acyl moiety of the ester reagent, and $R_2$ represents the residue of the alcohol moiety of the ester reagent.

The ester products which are within the scope of this invention are ones which contain substantial amounts of monoesterified polyhydric alcohol. In order to obtain these products it is necessary to use a large amount of polyhydric alcohol in the reaction mixture and to have an excess of unreacted polyhydric alcohol in the reaction mass at the end of the synthesis.

To carry out the reaction effectively one or more solvents are required at various stages of the process. Reaction solvents, also referred to as primary solvents, are required in order to get the reagents in the same phase so that the reaction may proceed at a satisfactory rate. To minimize side reactions in the synthesis of esters, moderate temperatures are generally required. Such moderate temperatures further enhance the need for reaction solvents to dissolve the polyhydric alcohol and ester reagents.

The unreacted polyhydric alcohol remaining after the reaction may be separated from the reaction mass by adding another solvent to the reaction mass, known as a secondary solvent, which selectively precipitates the unreacted polyhydric alcohol. Such a process is disclosed and claimed in my copending application Ser. No. 33,116, filed July 1, 1960 (U.S. Patent No. 3,141,012, issued July 14, 1964). The liquor recovered after precipitation is usually distilled to remove most of the secondary or precipitating solvent from the crude product.

In addition to, or in substitution for, the foregoing precipitation step, the crude reaction product may be processed in other ways, including the purification processes described in United States Patent No. 2,893,990. Such steps may introduce processing solvents in addition to the primary reaction solvent.

It is generally desirable to remove as completely as possible the primary and secondary and other processing solvents used in connection with the foregoing procedures, since some of these processing solvents are toxic, or irritating to the eyes and/or skin, and others, even though non-toxic, impart an undesirable odor or flavor to the product.

Furthermore, recovery of the processing solvents is important from an economic standpoint. The solvents required, particularly the reaction solvents, are relatively expensive, and since they add no value to the products, subtsantially complete solvent recovery is desirable to make the process economically attractive.

As described in my copending application Ser. No. 263,349, of which this application is a continuation-in-part (United States Patent No. 3,141,013, issued July 14, 1964) processing solvents of the foregoing description may be removed by distillation of the reaction mass containing the polyhydric alcohol ester in the presence of oxygenated solvents which are referred to as "fluxing agents." These oxygenated solvents make it possible to distill the processing solvents to low concentrations, so that their presence will not be objectionable.

However, because the fluxing agents are frequently solvents of relatively low volatility, such as ethylene glycol and glycerine, it may be impractical to remove completely the fluxing agent by distillation. Thus, for instance, a typical polyhydric alcohol ester may be distilled in the presence of a fluxing agent to remove processing solvents and the distillation continued under vacuum until the mass has a temperature of 100°–125° C. at a vacuum of less than 1 mm. Hg. pressure. Under these stripping conditions products containing up to 10% of the fluxing agent are often obtained. In other cases even higher concentrations of fluxing agent; i.e., 20% or more, may remain in one product. In some applications, concentrations of the fluxing agent of up to 10% or more may be undesirable.

Accordingly, it is an object of this invention to provide a method for reducing the concentration of fluxing agents in polyhydric alcohol ester products.

While this invention contemplates generally the separation of polyhydric alcohol esters and the solvents described in my United States Patent No. 3,141,013 mentioned above, for whatever reasons such agents may be admixed with the ester, it is a particular object of this invention to provide a method of improving the purified ester products which are obtained by practicing the process described and claimed in said United States patent.

These and other objects are realized by washing a polyhydric alcohol ester containing certain fluxing agents (which are described more particularly below) with a wash solvent consisting essentially of water. Generally, the ratio of the wash solvent to polyhydric alcohol ester will be in the range of about 1/1 to 10/1. The ester product is agitated with the wash solvent to thoroughly contact the former with the latter. Thereafter the mixture of ester product and wash solvent is separated into an ester-rich phase and a solvent-rich phase, and the solvent-rich phase is removed.

The success of the present invention depends upon the discovery that the wash solvent is miscible with certain fluxing agents to a sufficient degree to extract them from the ester product mass while, at the same time, the solvent does not dissolve any substantial amount of certain classes of polyhydric alcohol ester product.

More specifically, in the process to which the present invention is applicable, esters of solid polyhydric alcohols are prepared by reacting the solid polyhydric alcohol in a transesterification reaction with an ester of an alcohol and a carboxylic acid under conditions to form esters of the solid polyhydric alcohol with the acid and to release the alcohol. The reaction is carried out in the presence of a primary solvent and an alkaline catalyst for the reaction, and preferably utilizes a large excess of solid polyhydric alcohol to promote formation of a large proportion of monoesterified solid polyhydric alcohol.

Generally, the solid polyhydric alcohols which may be employed in the manufacture of esters applicable to the present invention are the polyhydric aliphatic alcohols that have at least four free hydroxyl groups, 4 to 12 carbon atoms, and have a melting point of at least about 85° C. They should also be free of groups which interfere with the transesterification reaction. Specific illustrative alcohols include sucrose, pentaerythritol, dipentaerythritol, xylitol, sorbitol, mannitol, the lower alkyl glucosides and acetyl glucosamine, and N-urea glucoside. Mixtures of the polyhydric alcohols can also be used. Such mixtures include mixtures of sorbitol and mannitol which are obtained by reduction of corn sugar and invert sugar and mixtures of pentaerythritols which are obtained by the condensation of acetaldehyde and formaldehyde in the presence of alkaline catalysts.

The acid moiety of the polyhydric alcohol ester is derived from reactants which are esters of aliphatic alcohols, gycols and glycerines on the one hand, and one or more fatty acids having principally from 14 to 24 carbon atoms on the other hand, the latter being free of groups which interfere with the transesterification reaction, and having no more than 2 oxygen atoms in addition to those in the carboxy group, and the ester having a titre of at least about 50° C. Naturally occurring mixtures are of great practical importance and are contemplated as suitable acid moieties within the scope of the present invention.

If the ester is a mixture of components, the mixture will normally contain a predominating amount of one to three particular acid moieties. Some naturally occurring fats or oils will meet these requirements. In other cases processing such as hydrogenation or fractional crystallization may be required to obtain an ester having a sufficiently high titre.

Typical ester reactants include, but are not limited to, hydrogenated tallow and other hydrogenated fats, hydrogenated cottonseed oil, hydrogenated oiticica and castor oils and other hydrogenated vegetable oils, hydrogenated marine oils such as fish and whale, hydrogenated esters of tall oil fatty acids, the ester component of various vegetable waxes such as carnauba and sugar cane wax, ethyl stearate, and mixtures of these esters.

Excellent results are generally obtained with refined mixed esters of saturated fatty acids such as the single, double and triple pressed grades of stearic acid of commerce. Mixtures consisting largely of arachidic and behenic acids derived from fish or rape-seed oils by hydrogenation and fractionation are another group of mixed acids particularly suitable for the present invention. In addition, the ester component may be relatively pure in terms of the fatty acid component, e.g., esters of palmitic, arachidic, behenic and lignoceric acids.

A number of primary reaction solvents may be used for the transesterification reaction. Useful primary solvents are described in detail in my above-mentioned United States Patent No. 3,141,012. Four groups are defined. These are briefly summarized as follows:

The first group consists of mono- and di-alkyl and alkoxy-alkyl amides of lower fatty acids, the amides containing from 3 to 8 carbon atoms. The group includes dimethyl formamide, dimethyl acetamide, N-n-amyl N-methyl formamide, N,N-di(methoxyethyl)formamide, N-methyl N-ethoxyethyl formamide, and N-methyl formamide.

The second group is composed of amides of lower fatty acids in which the nitrogen forms part of a heterocyclic ring system. This group of primary solvents includes N-formyl morpholine, N-acetyl morpholine, N-propionyl morpholine, dimethyl N-formyl morpholine, N-formyl piperidine and N-acetyl piperidine.

The third group of primary solvents are tertiary amines having one, two or three alkoxy-alkyl radicals, and having less than 9 carbon atoms. Examples include dimethyl methoxyethyl amine, methyl dimethoxy-ethyl amine, dimethyl ethoxyethyl amine, methyl ethyl methoxyethyl amine, dimethyl 2-methoxypropyl amine, and tri(methoxyethyl)amine.

The fourth group of primary solvents are the N-alkyl pyrrolidones and caprolactams. Examples include N-methyl-2-pyrrolidone, N-butyl pyrrolidone, and N-methyl caprolactam.

Mixtures of the primary reaction solvents described above may also be used.

After the transesterification reaction has terminated, any reaction catalyst present is normally deactivated to prevent reversion reactions. If, as is customary an algaline catalyst is employed, the catalyst may be deactivated by the addition of an acid such as those described in my U.S. Patent No. 3,141,013. As an alternative, the reaction mass may be maintained at the reaction temperature for a period of time sufficient to consume the alkaline catalyst by a saponification reaction.

After deactivating the catalyst, the reaction mass is subjected to one or more purification steps. It is these steps which introduce the fluxing agents which the present invention is adapted to remove.

As has already been mentioned, it is particularly contemplated that the fluxing agents will be added as a part of the fluxing process described in my aforementioned U.S. Patent. Thus, as disclosed in that patent, the fluxing agent is incorporated into the crude reaction mass containing some residual primary reaction solvents. The mass, including the fluxing agent, is thereafter subjected to distillation to remove a substantial portion of the residual primary reaction solvent. Generally, distillation is carried out at a temperature below 140° C., and may be carried out under vacuum.

Depending on the volatility of the fluxing agent, and the distillation conditions, the product resulting from the fluxing process may contain as little as 1% of the fluxing agent. However, it may not be convenient or practical to strip the fluxing agent so completely from the product ester. Some fluxing agents may be too low in volatility to be removed conveniently by distillation. Moreover, even if the fluxing solvent is sufficiently volatile that low concentrations could be obtained by distillation, it may be convenient not to do so in order to obtain thereby a relatively fluid product which can be handled more readily than a product which has been substantially freed of the fluxing agent.

The fluxing agent impurities which may be removed successfully by the present invention are one or more solvents selected from the group consisting of (a) The aliphatic diols having 2 to 6 carbon atoms, and partial esters of these diols with acetic, propionic and butyric acids in which the number of carbon atoms in the ester molecule does not exceed 6. These materials include ethylene glycol, the propylene glycols, the butane diols, triethylene glycol, dipropylene glycol, 2,2-dimethyl-1,3-butanediol and esters of these compounds with acetic, butyric and propionic acids in which one of the hydroxyls of the diol is esterified and the number of carbon atoms does not exceed 6.

(b) The aliphatic triols having from 3 to 6 carbon atoms, and monoesters of these triols with the lower fatty acids which have from 2 to 4 carbon atoms and diesters of glycerine and butane triols with the lower fatty acids, there being no more than 8 carbon atoms in the diester molecule. These materials include glycerine, the butane triols, 1,2,6-hexanetriol, and monoesters of these compounds with acetic, propionic, butyric and isobutyric acids in which 1 of the hydroxyl groups of the triol is esterified, and diesters of glycerine and butane triols with acetic acid.

(c) Partial esters of aliphatic dicarboxylic acids having from 4 to 6 carbons atoms with the lower alkanols, there being up to 7 carbon atoms in the ester molecule, partial esters of malic acid with the $C_1$-$C_4$ alkanols, and full esters of malic acid with the $C_1$-$C_2$ alkanols. Suitable lower monohydric alcohols are those having from 1 to 3 carbon atoms inclusive. Specific examples include the monoesters of methyl, ethyl, or propyl alcohols with the following acids: fumaric, maleic, and succinic acids and monoesters of adipic, and itaconic with methyl alcohol and the mono or diesters of methyl and ethyl alcohols with malic acid.

(d) Partial and full esters of methyl and ethyl alcohols with tartaric and citric acids and partial esters of methyl and ethyl alcohols with aconitic acid.

(e) Esters of lactic acid with the propanols and esters with the aliphatic diols having from 2 to 6 carbon atoms in which only one hydroxyl of the diol is esterified.

(f) Esters of acetoacetic acid and levulinic acid with the primary and secondary aliphatic monohydric alcohols which have from 1 to 3 carbon atoms; also esters with the aliphatic diols having from 2 to 6 carbon atoms in which only one hydroxyl of the diol is esterfied.

In the practice of this invention, it is generally desired that the reaction solvents described above, should be in a low concentration, preferably not exceeding about 10% based on the weight of the polyhydric alcohol ester. As has already been mentioned, the success of the present invention depends on employing a wash solvent which will not dissolve any appreciable quantity of the polyhydric alcohol ester. The presence of significant amounts of reaction solvents may seriously interfere with this objective. More than about 20% of the reaction solvent will tend to disperse or solubilize the polyhydric alcohol ester. This will make it difficult to subsequently separate the washed ester from the wash solvent.

It should be recognized, however, that it is not absolutely essential in all instances to reduce the level of reaction solvents below the 20% level. For instance, if the product ester has a relatively poor solubility in the wash solvent, larger amounts of unremoved reaction solvent may be tolerated.

As has already been mentioned, a particular object of this invention is to remove the fluxing agents from the polyhydric alcohol ester following the distillation process described in my United States Patent No. 3,141,013. Since that process will normally remove substantially all of the relatively volatile reaction solvents, there would normally be little need for concern as to the amounts of reaction solvent which may be present. On the other hand, if the ester product is worked up by other methods, which may not necessarily completely remove the reaction solvent, some attention should be given to this problem.

Generally, the ester product should also not contain more than about 50% fluxing agent, based on the weight of the ester product because large amounts of fluxing agent tend to make the separation of the ester product and wash solvent difficult. If large amounts of wash solvent are employed, and/or low separation temperatures are employed, esters containing up to about 50% fluxing agent, or in some instances possibly more, may be processed satisfactorily. If lower amounts of fluxing agents are used or higher separation temperatures, it is generally preferred to limit the amount of fluxing agent to about 20%. The factors of separation temperature and ratio of wash solvent to ester product are discussed in more detail below.

The wash solvent which is employed in the present invention consists essentially of water. In a number of applications, it is desirable that the ester product be relatively free of organic solvents and salts. I have found that water may be used to separate the polyhydric alcohol esters and the fluxing agents mentioned above. The resulting product will contain a significantly lower proportion of organic solvents.

While an important object of the present invention is to obtain ester products containing a reduce amount of residual organic solvents and salts, it should be recognized that the present invention is not necessarily limited to the use of pure water as the wash solvent. The water may contain some impurities, so long as such impurities are compatible with the ultimate use to be made of the ester product.

Thus, for instance, there may possibly be as much as 30% dissolved oxygenated organic solvents, such as alcohols, ketones, esters and ethers, without interfering with the essentially aqueous nature of the solvent. Likewise, dissolved salts may be present, such as sodium chloride, sodium sulfate, etc., in amounts of up to about 1%.

It is contemplated that the wash solvent according to this invention will consist essentially of water, i.e., the solvent will be free of materials which would interfere with the effectiveness of the water to remove the fluxing agent or not to dissolve excessive amounts of ester product. As disclosed in my copending application Ser. No. 382,391 filed July 13, 1964 (concurrently herewith) certain ketones, alcohols and esters are also useful as wash solvents with most fluxing agents and ester products mentioned herein. Therefore it is possible to practice simultaneously both the invention claimed herein and the invention claimed in my aforementioned copending application. Where the presence of an extraneous solvent, such as another wash solvent, will not have a substantial adverse effect on the relative solubilities of the ester product and the fluxing agent in the water wash, according to this invention, the phrase "consisting essentially of" as used herein and in the appended claims contemplates that the invention claimed in this application may be practiced simultaneously with the invention claimed in said copending application by the use of a wash solvent consisting essentially of water in conjunction with another wash solvent consisting essentially of a volatile oxygenated hydrocarbon, either concurrently or successively.

In the broadest aspects of this invention, the ester product containing a fluxing agent is dispersed in a wash solvent. The method or time of adding the wash solvent is not important. However, water is normally more volatile than the fluxing agents and a number of other solvents which might be used during the processing of the polyhydric alcohol ester. Accordingly, if the polyhydric alcohol ester is worked up by a method including a distillation step, the water should normally not be added until after distillation has been completed. Thus, for instance, as applied to the purification of the product of the process disclosed and claimed in my United States Patent No.

3,141,013, the water will be added after the fluxing process has been completed.

Generally, washing may be carried at any temperature below about 100° C. Heating of the solvent is not required. However, warming during the dispersion step may help to impart fluidity to the mass and thereby improve the thoroughness of washing.

Depending on the ester product and the relative proportions thereof to the wash solvent and the temperature at which dispersing takes place, partial or complete solution or colloidal dispersion of the ester in the wash solvent may occur. Such a result will lead to particularly effective washing. However, in this event subsequent cooling will be required to separate the washed ester from the wash solvent.

To disperse the ester efficiently, it is preferred to agitate the mass. Agitating is continued until the ester product has been thoroughly contacted with the wash solvent. Generally, a substantially uniform mass will be obtained. If the ester product has been prepared by a process resulting in a relatively dry, solid mass, it may be desirable to break up the product so that the largest lumps are not more than about ½ inch in diameter before adding it to the wash water to promote rapid dispersion of the ester in the water. Thereafter, water wash and the ester are agitated. Agitation may continue from less than 10 minutes to over an hour, although this will vary widely depending upon the initial condition of the mass before the wash solvent has been added, the temperature of mixing and the equipment used.

After the wash solvent and polyhydric alcohol ester have been thoroughly contacted with each other, the mixture is separated into a solvent-rich phase and a product-rich phase and the solvent-rich phase is removed. The solvent-rich phase will usually have a density which is less than the product-rich phase, and will be a relatively clear supernatant liquid.

The product-rich phase is, on the other hand, relatively solid. By referring to the product-rich "phase" it is not meant to imply that the ester product is necessarily dissolved or colloidally dispersed in the wash solvent. Reference is merely to the fact that the ester product will separate from the bulk of the wash solvent under the influence of gravitational or like forces into a separate cake, paste or sediment as a solid or semi-solid phase which generally contains some of the wash solvent dispersed therein.

Cooling the mass may be helpful to promote phase separation. This is discussed in more detail below.

Depending on the means of separation, the product-rich phase may range anywhere from a hard, wax-like solid to a pasty mass. In some cases a crystalline or particulate solid may be obtained. The most convenient method of separating the solvent from the product is sedimentation, either simple settling or centrifuging. If the solid is particulate filtration can be used. However, experience has shown that the product-rich phase for many systems has a plastic characteristic which renders filtration an impractical method of separation.

After the mixture of ester product and wash solvent has separated into two phases, at least a portion of the solvent-rich phase is removed. The fluxing agents contained in this phase are subsequently recovered by fractional distillation. The water recovered may be reused in the washing process already described or for other purposes, or discharged as convenience may indicate. By evaporating the water to dryness, any polyhydric alcohol and polyhydric alcohol ester which may have dissolved in the wash solvent may be recovered.

The product-rich phase may contain greater or lesser amounts of wash solvent depending upon the efficiency of the method of separating. The product may be dried to remove the water. Drying of the polyhydric alcohol ester product may be conveniently carried out in an agitated vessel, such as a Sigma-blade mixer. Drying may be continued until the temperature is in excess of around 110° C., and may be completed under a vacuum which is as low as may be practically obtained with the vacuum equipment available. This will permit the recovery of an ester product containing the highest possible percentages of solids. To avoid degradation of the product, drying temperature should not normally exceed about 140° C.

It is not necessary, however, that the product be stripped following removal of the water. It is contemplated, for instance, that mixtures of polyhydric alcohol and water in the form of a paste may be employed commercially because such materials can be readily handled. Pastes are especially useful in certain applications in the food processing and related industries. The substantially dry solid ester products are difficult to disperse in cake batters, bread doughs and mixes used to make frozen desserts such as ice creams and mellorines. The pastes or solutions, on the other hand, are easily dispersed, and are, therefore, especially adapted to the foregoing applications.

As already mentioned, the ratio of wash solvent to ester should be between about 1/1 and 10/1. In selecting a suitable ratio, the solubility of the ester product in the wash solvent should be considered. Some of the esters, especially those having lower titres, tend to solubilize or disperse in the water wash. To prevent excessive solubilization of such ester products, and the concomitant excessively large proportions of ester which would dissolve into the solvent phase, it is normally preferred to avoid high ratios. On the other hand, if the ester product is one which has a very low solubility in the water, it may be preferred to employ as high a ratio as possible in order to obtain the most effective washing of the fluxing agent remaining in the polyhydric alcohol ester.

The amounts of reaction solvent and fluxing agents present will also affect the solubility of the ester product in the wash solvent. If large quantities of such solvents are present, a larger proportion of wash solvent will be required to obtain a good recovery of the ester product in the product-rich phase, and to obtain a product-rich phase having a reduced content of fluxing agents.

In some cases it may be desirable to use a ratio of wash solvent to ester of as little as 1/1 to 1.2/1. Such ratios, however, tend to result in relatively heavy masses of wash solvent and ester. This renders mixing of the mixture more difficult. It is preferred to use a wash solvent to ester ratio between about 1.5/1 and 4/1.

While the washing step, itself, may be carried out at any convenient temperature, it is preferred that the mass not be excessively warm when the separation is made. To this end, the wash solvent-ester mass may be chilled before separation to a temperature below around 20° C.

As mentioned, if the ester product contains a large amount of fluxing agent it will be particularly important to use lower separation temperatures for optimum efficiency. This is also particularly important if smaller ratios of wash solvent to ester are used. In this respect, to obtain separation temperatures below about 0° C. an aqueous wash solvent containing up to about 30% of a water-soluble oxygenated hydrocarbon solvent as an anti-freeze agent should be used.

The washing process of the present invention may be conveniently carried out batchwise. However, it will be recognized that this invention is not so limited. Thus, for instance, continuous washing equipment may be provided. More importantly, the wash may also be carried out as a countercurrent extraction such as a multi-stage process. While the use of a staged countercurrent process will necessarily require the use of more complex and expensive equipment than would a simple batchwise process, it is possible to obtain much more efficient separation in this manner.

For a better understanding of this invention, reference may be had to the following examples.

EXAMPLE 1

A sucrose monostearate was prepared in accordance with the process described generally in my U.S. Patent No. 3,141,012. After the transesterification reaction had been completed, the mass was neutralized by the addition of citric acid and unreacted sucrose was precipitated by an addition of a secondary solvent. The mother liquor recovered containing dissolved sucrose monostearate was evaporated to substantial dryness.

Thereafter propylene glycol was added as a fluxing agent and stripping was continued under vacuum until a final stripping temperature of 110° C. was reached at a pressure of 9 mm. Hg. The vacuum was released and the stripped ester product was cooled to below about 100° C. To facilitate removal of the sucrose ester product, about 200 lbs. of water were added while the product was in the stripping pot. The mixture was kneaded until a pasty mass was obtained. This mass was removed from the stripping pot and transferred to a larger kettle for purposes of washing.

The paste which was charged to the kettle weighed 535 lbs. The paste was approximately 45% sucrose stearate ester, 10% propylene glycol and 45% water. Less than 0.1% dimethyl formamide was present.

This paste was added to a washing kettle containing approximately 700 lbs. of water. The mass was agitated at about 35° to 37° C. until a substantially uniform dispersion was obtained.

Thereafter, the entire mass was chilled to approximately 10° C. and pumped to a solid bowl centrifuge. To impart sufficient fluidity to permit pumping of the chilled mass to the centrifuge, 200 lbs. of water were injected into the line between the kettle and the centrifuge feed pump, and when the water was exhausted, the water-rich, clarified centrifuge effluent liquor was injected continuously into the line.

After centrifuging of the contents of the kettle had been completed, the clarified overflow, which had been collected in a hold tank, was charged to the wash kettle. This clarified overflow was agitated and chilled to about 10° C. and additional sucrose stearate was crystallized. The additional material crystallized was separated by pumping to the centrifuge. The product-rich cake was plowed from the centrifuge. It weighed 271 lbs. and contained 60.0% solids and 0.01% dimethyl formamide.

The ester product containing 40% water may be employed commercially as a paste without further processing. The finished product contained about 1.5% propylene glycol. Moreover, it had a substantially lighter color than the initial paste, and a lower content of unreacted sugar. Improvement of color and reduction of sugar content are important beneficial results accruing from the use of this process.

The following table illustrates further examples of the manner in which the process may be carried out. Specified in the table are the ester product treated, the fluxing agent impurity which was removed, the ratio of wash water to ester, and the temperature at which separation was made. In each of these examples the procedure generally outlined in Example 1 may be conveniently employed.

Although the invention has been described with reference to specific materials and procedures, it will be recognized that many modifications thereof are included within the scope of the appended claims, and that this invention is not limited to the specific compounds mentioned in the foregoing specification.

I claim:

1. In a process for refining polyhydric alcohol esters of solid polyhydric alcohols and fatty acids, said esters having been synthesized by a transesterification reaction between said polyhydric alcohol and an ester reactant, said polyhydric alcohol containing from 4 to 12 carbon atoms, at least 4 hydroxy groups and having a melting point of at least 85° C., and the acid moieties of said ester reactant having from about 14 to about 24 carbon atoms, being free of groups which interfere with the transesterification reaction and having no more than 2 oxygen atoms in addition to those in the carboxy group, said ester reactant having a titre of at least about 50° C., the ester of said polyhydric alcohol being admixed with not more than about 20% of a reaction solvent based on the weight of the polyhydric alcohol ester and up to 50% based on the weight of the polyhydric alcohol ester of at least one fluxing agent selected from the group of oxygenated polar organic solvents consisting of:

(a) aliphatic diols having from 2 to 6 carbon atoms and partial esters of these diols with acetic propionic and butyric acids in which the esters have not more than 6 carbon atoms, (b) aliphatic triols having from 3 to 6 carbon atoms, monoesters thereof with the lower fatty acids which have from 2 to 4 carbon atoms, and diesters of glycerine and butane triol with the lower fatty acids, there being no more than 8 carbon atoms in the diester molecule, (c) partial esters of aliphatic dicarboxylic acids having from 4 to 6 carbon atoms with the lower alkanols, there being up to 7 carbon atoms in the ester molecule, partial esters of malic acid with the $C_1$-$C_4$ alkanols, and full esters of malic acid with the $C_1$-$C_2$ alkanols, (d) partial and full esters of methyl and ethyl alcohols with an acid selected from the group consisting of tartaric and citric acids, and partial esters of methyl and ethyl alcohols with aconitic acid, (e) esters of lactic acid with a propanol and aliphatic diols having from 2 to 6 carbon atoms in which only one hydroxy group of the diol is esterified, and (f) esters of acetoacetic acid and levulinic acid with the primary and secondary aliphatic monohydric alcohols which have from 1 to 3 carbon atoms and the aliphatic diols which have from 2 to 3 carbon atoms in which only one hydroxy group of the diol is esterified, the improvement comprising dispersing said polyhydric alcohol ester with an amount of a wash solvent between 1 and 10 times the weight of the polyhydric alcohol ester, said wash solvent consisting essentially of water, thoroughly to contact said ester with said wash solvent and to obtain thereby a washed mass, separating said

| Example No. | Ester Product [1] | Fluxing Agent | Ratio of Water to Ester | Separation Temperature, ° C. |
|---|---|---|---|---|
| 2 | Mannitol myristate | Glycerine | 2/1 | 2 |
| 3 | Sorbitol behenate | Monopropyl succinate | 4/1 | 20 |
| 4 | Arachidate ester of α-methyl glucoside | Triethyl citrate | 10/1 | 15 |
| 5 | Sucrose monostearate | Propylene glycol monolactate | 3/1 | 10 |
| 6 | Sorbitol ester of hydrogenated cottonseed oil acids.[2] | Methyl levulinate | 5/1 | 5 |
| 7 | Sucrose ester of hydrogenated tallow.[3] | Propylene glycol | 1/1 | 3 |

[1] The product ester content of these preparations is more than 50% by weight monoesterified polyhydric alcohol, but substantial amounts of di- and polyesterified polyhydric alcohol esters may be present.
[2] Iodine Value of 3.
[3] Iodine Value of 4, titre=59° C.

washed mass into a solvent-rich phase comprising water, and said fluring agent and a product-rich phase, removing at least a portion of said solvent-rich phase from the washed mass, and recovering said washed mass containing the purified ester product.

2. A process according to claim 1 wherein the ratio of wash solvent to polyhydric alcohol ester is between about 1.5/1 and 4/1 based on the weight of the polyhydric alcohol ester.

3. A process according to claim 1 wherein said washed mass is separated into said solvent-rich phase and said product-rich phase at a temperature below about 20° C.

4. A process according to claim 3 wherein said acid moiety is selected from the group consisting of palmitate, stearate, arachidate, behenate and lignocerate.

5. A process according to claim 3 wherein said polyhydric alcohol is selected from the group consisting of sorbitol, mannitol, alpha-methyl glucoside and sucrose.

6. A process according to claim 3 wherein said oxygenated polar organic solvent is selected from the group consisting of propylene glycol, monoesters of propylene glycol, glycerine, mono and diesters of glycerine, mono esters of succinic acid, esters of citric acid and esters of levulinic acid.

ugena cop ftf4__°m

7. A process according to claim 3 wherein said ester of polyhydric alcohol is admixed with not more than about 10%, based on the weight of said polyhydric alcohol ester, of a reaction solvent.

8. A process according to claim 3 wherein said ester is sucrose stearate, and said oxygenated solvent is propylene glycol.

9. A process according to claim 3 wherein said ester is mannitol myristate and said oxygenated solvent is glycerine.

10. A process according to claim 3 wherein said ester is sorbitol behenate and said oxygenated polar organic solvent is monopropyl succinate.

11. A process according to claim 3 wherein said ester is the arachidate ester of alpha-methyl glucoside and said oxygenated polar organic solvent is triethyl citrate.

12. A process according to claim 3 wherein said ester product is sucrose stearate and said oxygenated polar organic solvent is propylene glycol monolactate.

13. A process according to claim 3 wherein said ester is the sorbitol ester of hydrogenated cottonseed oil acids and said oxygenated polar organic solvent is methyl levulinate.

14. A process according to claim 3 wherein said ester is the sucrose ester of hydrogenated tallow fatty acids and said oxygenated polar organic solvent is propylene glycol.

References Cited

UNITED STATES PATENTS 2,857,378   10/1958   Hales _____ 260—234

LEWIS GOTTS, *Primary Examiner.*

J. R. BROWN, *Assistant Examiner.*

UNITED STATES PATENT OFFICE
CERTIFICATE OF CORRECTION

Patent No. 3,378,543            April 16, 1968

Charles J. O'Boyle

It is certified that error appears in the above identified patent and that said Letters Patent are hereby corrected as shown below:

Column 4, line 43, "galine" should read -- kaldne --.
Column 6, line 26, "reduce" should read -- reduced --.
Column 11, line 1, after "water" cancel the comma; line 2, "luring agent" should read -- fluxing agent, --; line 25, cancel "ugena cop ftf4--°m".

Signed and sealed this 19th day of August 1969.

(SEAL)
Attest:

Edward M. Fletcher, Jr.          WILLIAM E. SCHUYLER, JR.
Attesting Officer                 Commissioner of Patents